United States Patent Office 3,655,886
Patented Apr. 11, 1972

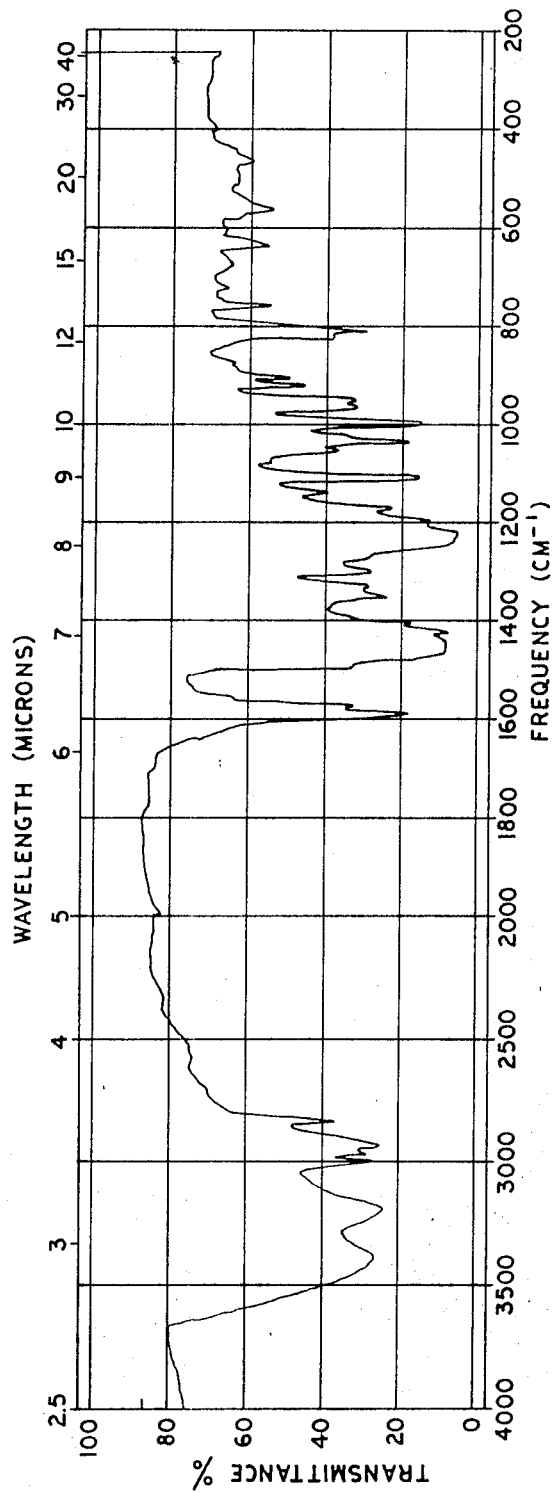

3,655,886
PHARMACOLOGICALLY EFFECTIVE SUBSTANCE AND PROCESS FOR PREPARING IT
Alfred Groebel, Bad Soden, Taunus, and Ernst Lindner, Frankfurt am Main, Germany, assignors to Farbwerke Hoechst Aktiengesellschaft vormals Meister Lucius & Brüning, Frankfurt am Main, Germany
Continuation-in-part of abandoned application Ser. No. 731,425, May 23, 1968. This application Aug. 11, 1970, Ser. No. 63,014
Claims priority, application Germany, June 3, 1967, F 52,592
Int. Cl. A61k 27/14
U.S. Cl. 424—195                     5 Claims

ABSTRACT OF THE DISCLOSURE

A pharmacologically active substance isolated from the bark of Ravensara aromatica by extraction of the bark with a lower alcohol, evaporation of the extract to give a solid residue, and chromatography of the residue.

---

This is a continuation-in-part of U.S. patent application Ser. No. 731,425, filed May 23, 1968, now abandoned.

The present invention relates to a pharmacologically effective substance and to a process for isolating it.

We have found that a pharmacologically highly effective substance having a strong and long lasting blood pressure lowering activity can be isolated from Ravensara aromatica.

Ravensara aromatia is a plant belonging to the family Lauraceae which is found in Madagascar and is also known by the scientific names of Laurus aromatica and Agatophyllum ravensara.

The new substance is isolated from the bark of Ravensara aromatica, which has previously been dried and crushed. For the extraction, lower alcohols, preferably methanol or ethanol, are used. After evaporation of the solvent, a syrup remains behind which is subjected to distillation in a high vacuum in order to remove other highly effective oily substances. The solid distillation residue can be purified by chromatography on a column containing, for example, aluminum oxide or silica gel. As eluant, organic solvents are used which contain, depending on their eluting capacity, 2–30% of a lower alcohol, preferably methanol or ethanol. Suitable solvents are, for example, benzene, chloroform, methylene chloride, di-isopropyl ether, ethyl acetate, dioxane and tetrahydrofurane. The optimal mixing proportion of organic solvent to alcohol can be determined by preliminary tests. Solvent mixtures such as chloroform/benzene in a ratio of 90:10 and benzene/methanol in a ratio of 80:20 have worked well.

The active substance crystallizes from the eluate as hydrochloride in the form of weakly colored needles which can be purified by recrystallization from ethanol. The free base may be obtained by treating the hydrochloride with a base, for example with aqueous ammonia. From the free base, other salts may be obtained, if desired, by treatment with inorganic or organic acids, for example with sulfuric acid or acetic acid.

Prior to the extraction of the active substance, it is suitable to remove lipoid substances from the bark, for example, by extraction with petroleum ether or carbon tetrachloride. It is also possible to remove, the above described active oils by extraction with chloroform prior to the extraction with alcohols. This extraction should advantageosuly be effected at room temperature, because, as described above, the substance of the present invention is partially soluble in hot chloroform. After the extraction with chloroform, the bark is then extracted with alcohol and the extract is worked up as described above.

In the form of its hydrochloride, the substance forms small colorless needles (from alcohol) which melt at 230° C. with decomposition. The free compound melts at 223–224° C. and consists of carbon, hydrogen, oxygen and nitrogen. Quantitative analysis showed the following values:

|   | Percent |
|---|---|
| C | 62.7 |
| H | 6.5 |
| N | 4.1 |

A determination of the molecular weight by mass spectrometry showed a molecular weight of about 355. The substance shows a specific rotation of $[\alpha]^D{}_{20} = +172°$ (in ethanol); it has ultraviolet maxima at 270 m$\mu$ (1 g. $\epsilon_1 = 4.622$) and 300 m$\mu$ (1 g. $\epsilon_2 = 4.249$) (in methanol). The infrared spectrum (in KBr) is shown in the attached chart.

In thin-layer chromatography on silica gel, the substance has a $R_f$-value of 0.36 using the system ethyl acetate/butanone/formic acid/water, in the ratio of 5:3:1:1. It can be made visible on the chromatogram with Dragendorff's reagent as an orange red spot.

The free base is soluble in methanol and chloroform. The hydrochloride is easily soluble in lower alcohols such as methanol, ethanol, propanol and propylene glycol as well as in water, but is sparingly soluble in hot chloroform and hot acetatone, and is insoluble in petroleum ether, benzene, carbon tetrachloride, ether, tetrahydrofurane and dioxane. With silver nitrate, lead acetate, Reinecke salt, phosphotungstic acid and phosphomolybdic acid, the substance yields grey to brown colored precipitates.

The substance obtained according to the present invention is distinguished by a strong and long lasting blood pressure lowering activity. It provokes, when administered intravenously to a dog in a dose of 0.5 mg./kg., a lowering of the blood pressure of 50 mm. lasting for about 25 minutes. With 1.5 mg./kg., administered intravenously, it provokes a lowering of the blood pressure of 75 mm., which is not yet compensated after 30 minutes. The heart frequency is insignificantly lowered only temporarily. Respiration and electrocardiogram are not influenced.

The $DL_{50}$ in a rat, upon intravenous administration, is about 5 mg./kg. of body weight.

Owing to its excellent blood pressure lowering activity, the new substance is generally suitable for the treatment of cardiac and circulatory disorders, for example for the treatment of chronical hypertonia, cardiac insufficiency, Angina pectoris and blood circulation disorders. It can be administered perorally or intravenously. The dose, which depends on the weight of the patient and on the severity of the disease, amounts to about 15–30 mg. in the case of intravenous administration and to about 30–60 mg. in the case of oral administration.

For oral administration, especially tablets or dragées are used which contain the active substance in free form or in the form of a salt in a quantity of 5 to 30 mg. per dosage unit in addition to the usual adjuvants and carriers such as talc, starch, lactose, etc. For intravenous administration, an aqueous solution of the substance is preferably used.

The following examples illustrate the invention but they are not intended to limit it thereto:

EXAMPLE 1

465 g. of bark of Ravensara aromatica were extracted in a Soxhlet apparatus at first with petroleum ether and then, to exhaustion, with methanol. The methanol extract was evaporated, whereafter a syrupy brown residue remained behind (29 g.). Oily substances were removed by distillation at a bath temperature of 70° C. and a pressure of 1 mm. Hg. The solid residue of the distillation (19 g.) was adsorbed on 10 g. of aluminum oxide (Woelm neutral, activity degree I) and chromatographed on 300 g. of aluminum oxide. Undesired accompanying substances were eluted with chloroform. The active fraction could be eluted with chloroform containing 10% of methanol and crystallized from the eluate in weakly colored needles. By recrystallization from ethanol, the substance was obtained in the form of colorless and odorless needles. Yield: 78 mg.

EXAMPLE 2

529 g. of bark of *Ravensara aromatica* were stirred for 1 hour at room temperature with 2 liters of chloroform. The whole was then filtered and the operation was repeated twice. The bark was then extracted in a Soxhlet apparatus with 96% ethanol. The residue (25 g.) obtained in dry state upon evaporation was adsorbed on 15 g. of silica gel (Merck, grain size 0.2–0.5 mm.) and chromatographed on 500 g. of silica gel. The accompanying substances were eluted with benzene. The active fraction was eluted with a mixture of benzene and 20% methanol and crystallized from ethanol. Yield: 99 mg.

EXAMPLE 3

32 kg. of ground bark of *Ravensara aromatica* were extracted with methanol in a large size extractor. The solution was concentrated under reduced pressure to 5 liters. The concentrated product was stirred three times each time with 3 liters of petroleum ether (35–65°). The layers were separated and the petroleum ether layer was rejected. The methanol phase was concentrated and the oils were removed by distillation as described in Example 1. The residue (197 g.) was adsorbed on 250 g. of aluminum oxide (Woelm neutral, activity degree I) and chromatographed as described in Example 1 on 5.5 kg. of aluminum oxide. The yield of active substance was 5.8 g., after recrystallization from ethanol.

We claim:

1. A process for preparing a pharmacologically active substance which comprises extracting the bark of *Ravensara aromatica* with methanol or ethanol, evaporating the extract to dryness to give a solid residue, and then separating the active substance from the residue by column chromatography on aluminum oxide or silica gel using, as an eluant, a mixture containing 2–30 percent of methanol or ethanol in an organic carrier liquid in which said active substance is insoluble.

2. A process as in claim 1 wherein said bark is extracted with a member selected from the group consisting of petroleum ether, chloroform, and carbon tetrachloride prior to extraction with methanol or ethanol.

3. A pharmacologically active substance extracted from the bark of *Ravensara aromatica* according to the process of claim 1, said substance being soluble, as a free base, in lower alcohols, propylene glycol, and water, and being insoluble in petroleum ether, benzene, carbon tetrachloride, ether, tetrahydrofurane, and dioxane, and having the following other physical properties:

Composition: carbon, hydrogen, oxygen, and nitrogen;
Elementary analysis (as free base): C, 62.7%; H, 6.5%; N, 4.1%.
Melting point: 223–224° C.;
Molecular weight: about 355 (by mass spectrometry);
Ultraviolet absorption maxima (in methanol): 270, 300 millimicrons;
Ultraviolet absorption (in KBr) as in the accompanying figure;
Specific rotation: $[\alpha]_D^{20} = +172°$ (in ethanol);
$R_f$ value=0.36 in ethyl acetate/butanone/formic acid/water (5:3:1:1).

4. A pharmaceutical composition for lowering blood pressure comprising an effective amount of the pharmacologically active substance of claim 3 in combination with a pharmaceutically acceptable carrier.

5. The method of lowering blood pressure which comprises orally or intravenously administering to a patient an effective amount of the pharmaceutically active substance of claim 3.

No references cited.

STANLEY J. FRIEDMAN, Primary Examiner

U.S. Cl. X.R.

260—236.5